Nov. 28, 1967  A. M. MOEN  3,354,910
MIXING VALVE
Filed May 13, 1965  3 Sheets-Sheet 2
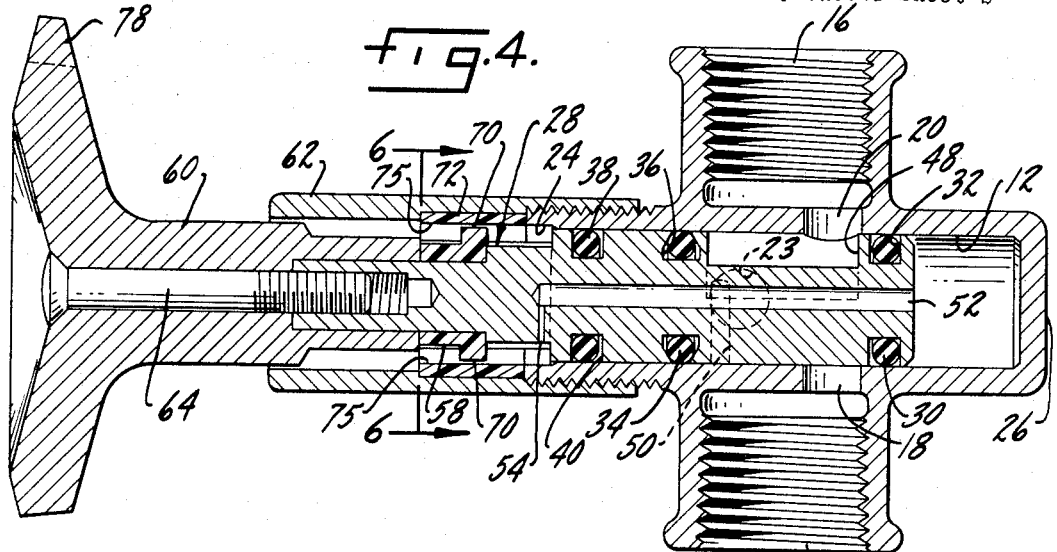
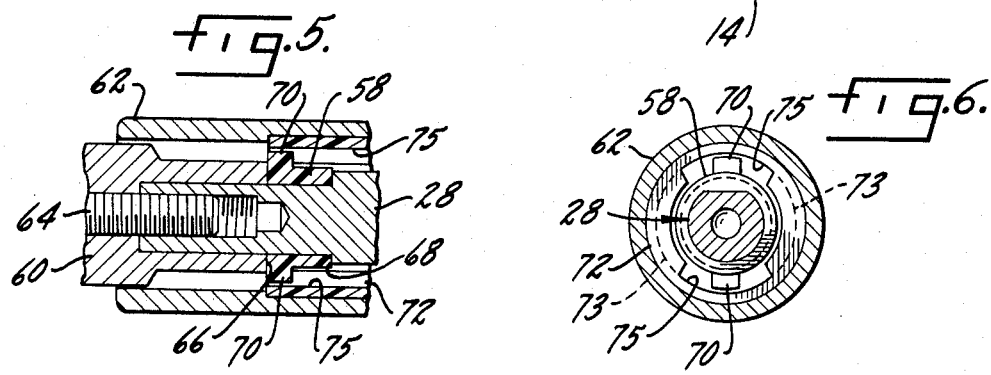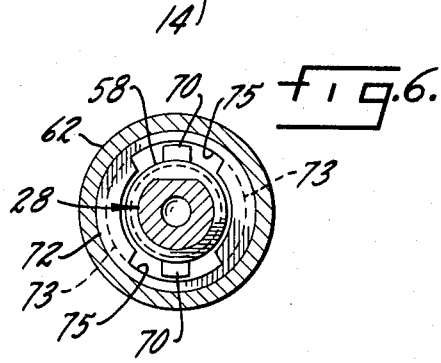
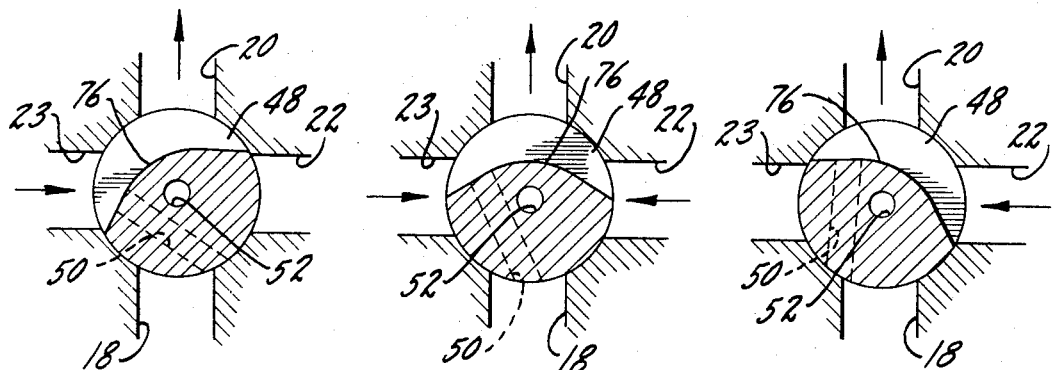
INVENTOR.
Alfred M. Moen,
BY Parker & Carter
Attorneys.

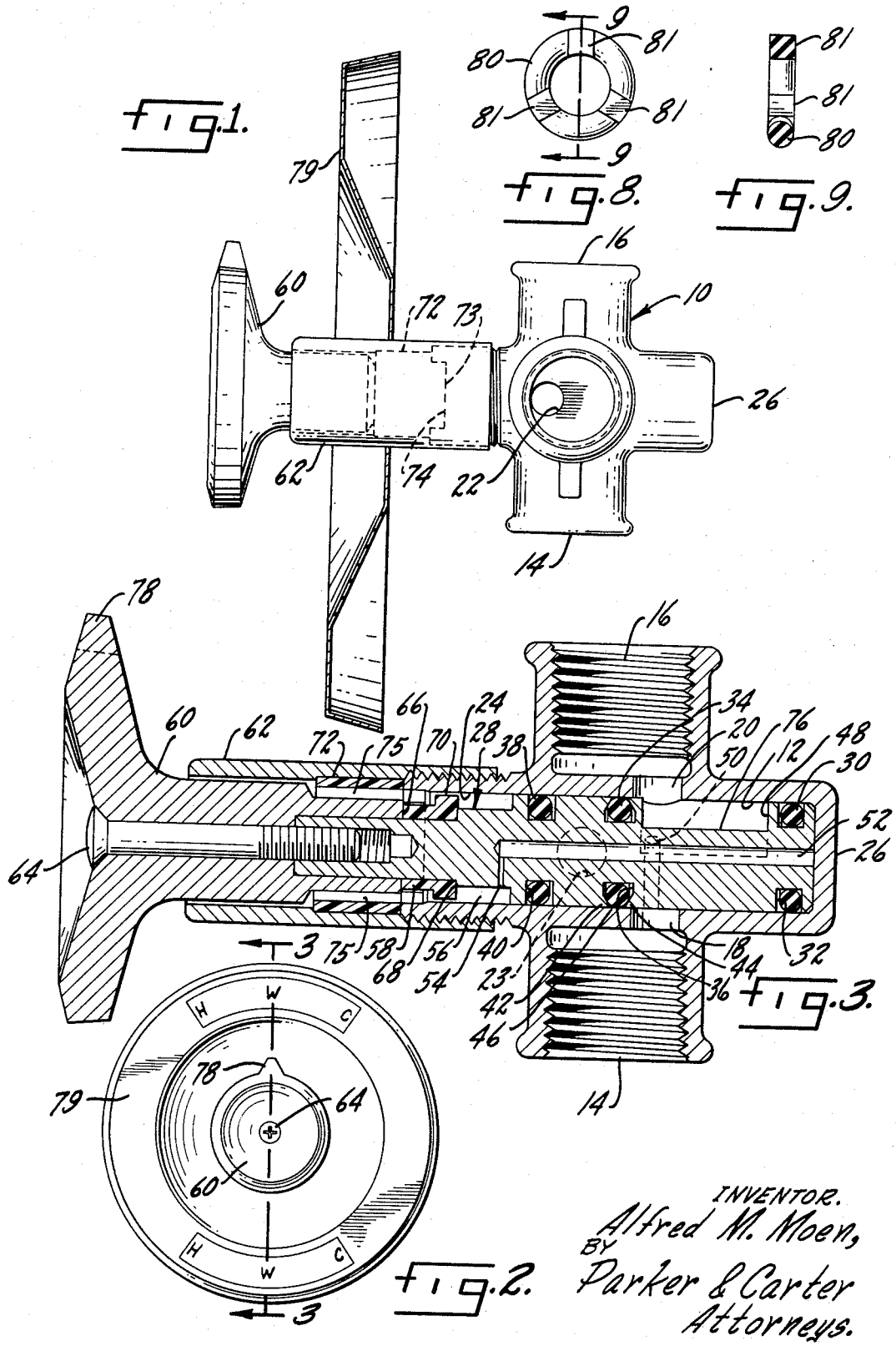

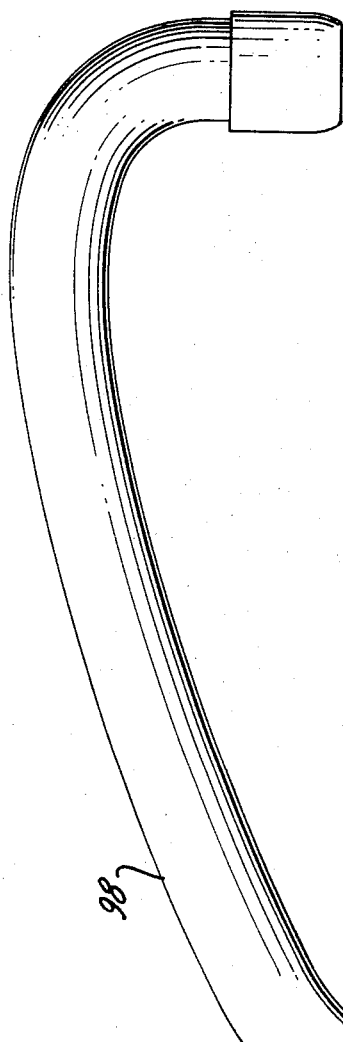
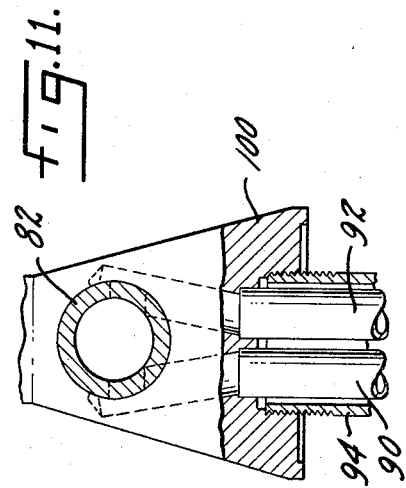
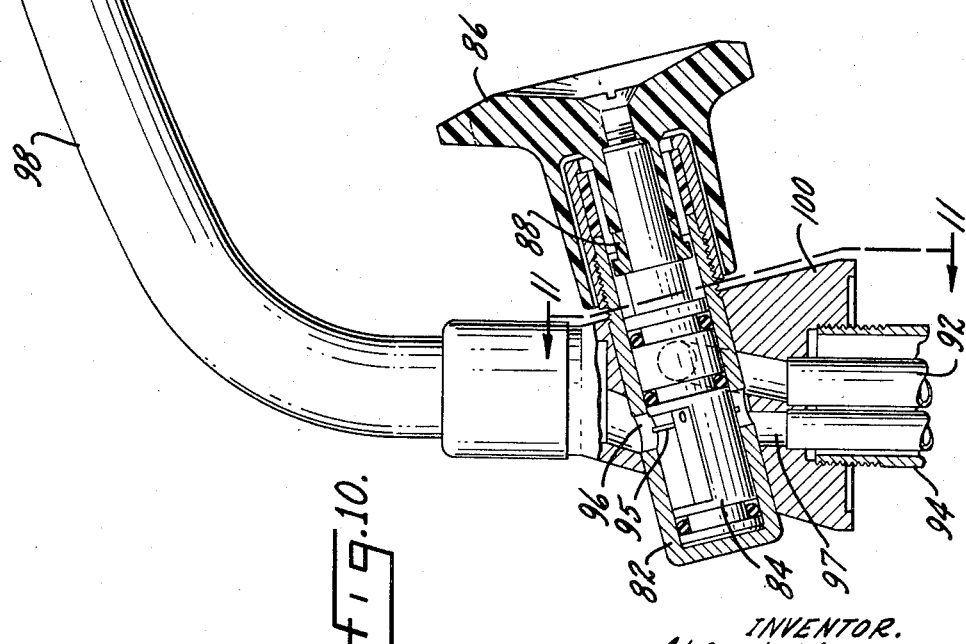

United States Patent Office 3,354,910
Patented Nov. 28, 1967

3,354,910
MIXING VALVE
Alfred M. Moen, 25 Lakeview Drive,
Grafton, Ohio 44044
Filed May 13, 1965, Ser. No. 455,380
22 Claims. (Cl. 137—625.17)

This invention relates to a mixing valve for use in mixing hot and cold water and for regulating the volume of the discharge.

A primary purpose of the invention is a simply constructed and reliably operable valve of the type described.

Another purpose is a mixing valve which may be arranged for one or two discharge operations.

Another purpose is a mixing valve of the type described in which the valve itself contains the means for switching from one discharge to another, thus eliminating the necessity of a diverter.

Another purpose is a reliably operating mixing valve which may be arranged for two or one discharge operation merely by repositioning a single part in the valve.

Another purpose is a mixing valve of the type described in which the valve stem forms the only movable member in the valve.

Other purposes will appear in the ensuing specification, drawings and claims.

The invention is illustrated diagrammatically in the following drawings wherein:

FIGURE 1 is a side elevation of the valve with the escutcheon plate in section,

FIGURE 2 is a front view, on a reduced scale, of the valve showing the valve handle and escutcheon plate, FIGURE 3 is a vertical section, on an enlarged scale, along plane 3—3 of FIGURE 2, FIGURE 4 is a vertical section, similar to FIGURE 3, but with the valve in the open position, FIGURE 5 is a partial section showing one element of the valve in the reversed position, FIGURE 6 is a vertical section along plane 6—6 of FIGURE 4, FIGURES 7a, 7b, and 7c are diagrammatic illustrations of the various positions of the valve stem in controlling the flow of water through the valve, FIGURE 8 is a plan view of a modified sealing ring, FIGURE 9 is a section along plane 9—9 of FIGURE 8, FIGURE 10 is a partial vertical section through a modified form of valve, and FIGURE 11 is a partial side elevation with parts in section and parts removed taken on line 11—11 of FIGURE 10 and illustrating the valve of FIGURE 10.

This invention relates to valves of the type used in single-lever mixing faucets. Such mixing faucets may be found in the bathroom, both at the basin and at the shower and tub combination, as well as in the kitchen. Conventionally, such a valve is rotated to regulate the temperature of the water and reciprocated to regulate the volume. The present valve operates in the conventional manner. Such valves have found immediate and widespread commercial acceptance because of their ease of operation.

In FIGURE 1, a valve housing 10 may be a conventional brass housing or it may be otherwise, for example a suitable plastic or the like. The housing 10 may have a generally central chamber 12 which is in communication with discharge ports 14 and 16, through discharge openings 18 and 20. Note that the discharge openings 18 and 20 are generally diametrically opposed. This is the preferred construction, although it may be otherwise. Water flows into the chamber 12 for discharge from ports 14 and 16 through inlet openings 22 and 23 one of which is indicated at 22 in FIGURE 1. The inlet openings may also be generally diametrically opposed, although this will vary depending upon the type of installation. Of importance is the fact that the discharge openings are axially spaced from the inlets. In this way the valve stem described hereinafter may be utilized to open and close the valve. The valve housing 10 has an open end 24 through which the valve stem extends and a closed end 26 which is used for bottoming the stem when it is in the closed position.

Turning now to FIGURES 2 and 3, a valve stem indicated generally at 28 is positioned within the chamber 12 and is shown in FIGURE 3 in the closed positon. At one end of the valve stem an O-ring 30 may be positioned within a groove 32. A second O-ring 34 may be positioned within a groove 36 and a third O-ring 38 positioned within a groove 40. Note that O-rings 34 and 38 are on opposite sides of the inlets when the valve is in the closed position, thus preventing any water seepage to the valve outlets. When the valve is in the open position, O-rings 30 and 34 will be on opposite sides of the discharge, again preventing water seepage. O-ring 38 will prevent water seepage toward the handle area when the valve is in the open position. The construction of O-ring groove 36 is unique in that it includes slanted walls 42 and 44 which define an opening 46 having an axial width smaller than the largest diameter of the O-ring. O-rings are normally formed from a sufficiently flexible and distortable material so that the O-ring may be pushed into the groove. The particular construction of groove 36 will prevent a cross flow of water between the two water inlets. Because of the construction of the groove there will be a circumferential seal between ring 34 and the sides of groove 36.

A notch 48 may be formed in the stem 28 and has an axial cross section as shown in FIGURE 3 and a radial cross section as illustrated in FIGURE 7. In the closed position of FIGURE 3 notch 48 is not in communication with either of the inlets. However, in the open postion of FIGURE 4, note that notch 48 can be in communication with both inlets, as well as with discharge opening 20. Reciprocation of the stem is effective to connect the inlets with one of the discharge openings.

Valve stem 28 may include a small passage 50 which connects notch 48 with the opposite side of the valve stem. Thus when the valve is used in a shower and tub combination, such as shown in FIGURES 2 and 3, and assuming that the bottom discharge opening or port 14 discharges to the tub, then when the valve is in the closed position, passage 50 will connect the tub discharge with the shower discharge and thus any water which is in the lines leading up to the shower head may be discharged down to the tub to keep the lines all clear.

The stem may include an axially directed air vent passage 52. When the valve is in the open position of FIGURE 4, passage 52 connects the space between end wall 26 and the end of the valve stem with space 56 through a small radially directed passage 54. Space 56 surrounding the valve stem beyond O-ring 38 will be in communication with the atmosphere through the loose connections of the handle.

A collar or the like 58 may be fixed on valve stem 28 by means of a handle structure 60. The handle structure 60 extends outside of a sleeve 62 which may be threaded to the exterior surface of housing 10. A screw or the like 64 may fasten handle 60 to the valve stem. Note that the collar 58 is held between an end surface 66 of the handle and a shoulder 68 on the valve stem. There may be mating flattened areas on the stem and collar to prevent relative rotation between the two members. Collar 58 may have a pair of axially limited radial projections 70 which are generally diametrically opposed, and in the position of FIGURES 3 and 4, are at the inward end of the collar. A sleeve 72 may be positioned inside of sleeve 62 and is in effect a continuation of the open end 24 of the housing 10. Sleeve 72 may have a pair of projections 73 and the adjacent portion of the open end 24 may have a pair of generally diametrically opposed arcuate grooves 74. The projections 73 and grooves 74 key together to prevent rotation of the sleeve 72. The sleeve 72 may also have a pair of generally diametrically opposed internal arcuate grooves 75. The grooves 75 may have a greater arcuate extent than projections 70 and each projection 70 may be positioned within a groove to limit rotation of the valve as described hereinafter. Note particularly FIGURE 6.

An escutcheon plate 79, having suitable indicia or dials thereon, as shown in FIGURE 2, may be mounted to the wall surface adjacent handle 60. The dials on plate 79 may be utilized in indicating whether the valve is arranged for shower or tub operation and whether the water discharge is hot or cold.

Notch 48 has an arcuate inner wall 76. Note FIGURE 7 which shows three different positions of the valve stem. In the center position both of the inlets are in communication with the open area of the notch and water is discharged through the upper pipe. In the right-hand position of FIGURE 7 the stem has been rotated so that only the right-hand inlet feeds water into the upper pipe. The reverse is true in the left-hand position of FIGURE 7 in that water from the left side enters the notch and is discharged through the upper pipe. When the valve has been reversed, as explained hereinafter, to discharge through the lower pipe, the stem again may be positioned to draw water from either or both of the inlets.

When collar 58 is in the position of FIGURES 3 and 4, the valve may be used for both shower and tub operations. A diverter is not necessary. Initially the valve may be in the closed position of FIGURE 3. To operate the valve, handle 60 is pulled outwardly until notch 48 is in communication with one or both of the inlets. The handle is then rotated until the desired temperature or water is discharged upwardly through the shower discharge port 16. As handle 60 is pulled outwardly, projections 70 will be positioned in grooves 74. When the projections are so positioned the arcuate extent of valve rotation is limited to that range which will provide any desired water temperature through the shower, but it is impossible to rotate the valve such that water discharge will be through the tub outlet.

To utilize the tub outlet, rather than the shower outlet, handle 60 is pushed to the full "in" position of FIGURE 3. The handle is then rotated so that the pointer 78 on handle 60 is directed at the lower dial, which in this case is the dial for setting the tub control. The upper dial in FIGURE 2 is the dial for setting the shower control. Once pointer 78 has been set to the tub position, subsequent outward movement of the handle and stem will control the volume and temperature of water discharging through the tub outlet as notch 48 will then be in the bottom position. In other words, to change from tub operation to shower operation or the reverse, it is merely necessary to push handle 60 completely in and then rotate handle 60 until knob 78 points to the form of operation that is desired. The handle can then be pulled outwardly and operated in the normal manner.

FIGURE 5 shows the same valve with collar 58 reversed. When collar 58 is in the position of FIGURE 5, the valve can be operated as a tub valve or as a shower valve, but not as both. In this position note that projections 70 are always within grooves 74. As projections 70 only extend a part of the axial distance of collar 58, in the position of FIGURES 3 and 4, it is possible to change from tub to shower operation and the reverse. In the position of FIGURE 5 it is not. Once collar 58 is positioned on the stem and the stem is positioned within the valve housing, the valve will operate either to discharge through the shower or through the tub outlet, but the position cannot be reversed without reversing the collar.

FIGURES 8 and 9 show a form of seal ring which may replace the combination of groove 36 and ring 34. A seal ring 80 having a circular cross section through most of its circumference may have section 81 with a square or rectangular cross section. With such a ring, the groove holding the ring would have the same cross section as the sections 81, thereby preventing circumferential seepage or cross flow of water.

Turning now to FIGURES 10 and 11, a valve housing is indicated at 82 with the valve stem being indicated at 84. A handle 86 may be fastened to the valve stem and the collar which controls the direction of water discharge is indicated at 88. The hot and cold water inlet pipes are shown at 90 and 92, and they may come up from beneath and be positioned within a conduit or the like 94. One discharge for the water is through port 96 at the top of housing 82, and then upwardly through a curved spout or the like 98. The conventional auxiliary spray device may have a discharge passage 97, although the spray device itself is not shown. A circumferential groove 95 may connect port 96 and discharge passage 97 when the valve is in the open position. Thus if the valve is left open and in a position to discharge through the spray, a small amount of water will drip from the spout indicating the valve is open. This is assuming the spray has a separate control to actuate it, which control is closed. A base 100 may be utilized to mount the entire structure on a sink top or a mounting plate or the like. The structure illustrated in FIGURES 8 and 9 may be a conventional single-lever operated sink faucet, but it should be realized that the same general structure can also be used for a bathroom basin faucet.

Although the structure of FIGURES 8 and 9 includes a separate dial 86 for regulating the faucet output, it should be understood that the invention works equally satisfactory with a lever for manipulating the valve structure. Any type of manual operating means is satisfactory for controlling the valve.

In general, the invention includes a reliably operable and simply constructed mixing valve which does away with a conventional diverter for changing the direction of water discharge. The invention is usable in a tub and shower combination or a basin or sink faucet in which a diverter is used conventionally to actuate a spray.

The collar 58 may be set in either one of two positions. In one position, it permits the valve handle to be utilized to divert water from one discharge passage to another. In the second position it restricts discharge to a single passage.

The various parts or members of the valve may, as conventional, be formed of brass and rubber or a rubber substitute. However, some of the elements of the valve may be formed of a suitable plastic or the like.

The invention is inherently pressure-balanced in that the opposing surfaces of notch 48 are generally equal in size and so the water pressure on these two surfaces will act equally in opposite directions and will hold the valve stem in any adjusted position.

It is important to have an air vent in the valve so that there will not be a vacuum formed in the small chamber between the closed end 26 and the opposing end of the valve stem. Without an air vent it may be difficult to reciprocate the valve stem.

The valve shown herein may be placed within a sleeve and the sleeve placed within the housing. In such a structure the valve and sleeve would form a replaceable unit or valve cartridge.

Whereas the preferred form of the invention has been shown and described herein, it should be realized that there are many modifications, substitutions and alterations thereto within the scope of the following claims.

I claim:

1. In a valve for mixing hot and cold water, a housing having a central chamber, hot and cold water inlets in said housing in communication with said chamber, a pair of discharge openings in said housing in communication with said chamber, said discharge openings being circumferentially spaced one from another and both being axially spaced from said inlets, a reciprocal and rotatable stem positioned in said chamber, sealing means effective between said stem and said housing, said stem having a notched area of a size and shape to permit one or both of said inlets to be placed in communication with one of said discharge openings, means limiting rotation of said stem through an arc such that said notch can only be placed in communication with one of said discharge openings at a time, and means for selecting said one discharge opening from said pair of discharge openings.

2. The structure of claim 1 further characterized in that said discharge openings are generally diametrically opposed.

3. The structure of claim 1 further characterized in that the means limiting rotation of said stem includes a collar fastened on said stem, said collar having portions positioned to interlock with and be limited by said rotation limiting means.

4. The structure of claim 3 further characterized in that said collar has diametrically opposed arcuately extending projections, said housing having arcuate grooves of greater arcuate extent than said projections, with said projections being movable within said grooves.

5. The structure of claim 1 further characterized in that said stem is reciprocal between a fully closed position in which the stem is fully rotatable and an open position in which rotation of the stem is restricted by said limiting means.

6. The structure of claim 1 further characterized by and including an air vent passage connecting said chamber with the atmosphere.

7. The structure of claim 6 further characterized in that said air vent passage extends partially through said stem.

8. The structure of claim 1 further characterized by and including handle means connected to said stem for use in rotating and reciprocating it.

9. The structure of claim 1 further characterized by and including a passage in said stem connecting said notch with the opposite side of said stem.

10. The structure of claim 1 further characterized in that said housing includes a sleeve section and a main body section, said sleeve section being attached to said main body section and extending generally parallel with said stem.

11. The structure of claim 10 further characterized in that said sleeve section has axially extending arcuate grooves, said stem having arcuate projections movable in said grooves.

12. The structure of claim 1 further characterized in that said sealing means include a plurality of O-rings recessed into said stem and bearing against said housing.

13. The structure of claim 12 further characterized in that each of said O-rings is positioned in a circumferential groove in the exterior surface of said stem, one of said grooves having an exterior opening smaller in axial width than the diameter of its O-ring.

14. The structure of claim 12 further characterized in that each of said O-rings is positioned in a circumferential groove in the exterior surface of said stem, one of said rings having at least one area equal in size and shape to that of the groove within which the ring is positioned, thereby blocking circumferential flow through said groove.

15. In a valve for mixing hot and cold water, a housing having a central chamber, hot and cold water inlets in said housing in communication with said chamber, a pair of discharge openings in said housing in communication with said chamber, said discharge openings being circumferentially spaced one from another and both being axially spaced from said inlets, a reciprocal and rotatable stem positioned in said chamber, sealing means effective between said stem and said housing, said stem having a notched area of a size and shape to permit one or both of said inlets to be placed in communication with one of said discharge openings, a collar on said stem, said collar having at least one arcuate projection, an arcuate groove on the interior surface of said housing, said projection extending into said groove, said groove being of greater arcuate extent than said projection, to limit rotation of said stem through an arc such that said notch can only be placed in communication with one of said discharge openings.

16. The structure of claim 15 further characterized by a pair of arcuate projections and a pair of arcuate grooves, said projections being diametrically opposed to each other, and said grooves being diametrically opposed to each other.

17. The structure of claim 16 further characterized in that said projections have an axial length less than that of the collar.

18. The structure of claim 15 further characterized in that said projection is outside of said groove at one position of said stem whereby said stem may be completely rotated at said one position.

19. The structure of claim 15 further characterized in that said collar is reversible.

20. In a valve for mixing hot and cold water, a housing having a central chamber, hot and cold water inlets in said housing in communication with said chamber, a pair of discharge openings in said housing in communication with said chamber, said discharge openings being spaced, one from another, and being axially spaced from said inlets, a reciprocal and rotatable stem positioned in said chamber, sealing means effective between said stem and said housing, said stem having a notched area of a size and shape to permit one or both of said inlets to be placed in communication with one of said outlets, a collar on said stem, said collar having a pair of arcuate projections whose axial length is less than that of the collar, said projections being generally diametrically opposed, a pair of arcuate grooves on the interior surface of said housing, said grooves being generally diametrically opposed and having an arcuate length greater than that of said projections, said grooves axially overlapping said collar at least a portion of the axial travel of the collar, the combination of said grooves and projections limiting rotation of said stem through an arc such that said notch can be placed in communication with only one of said discharge openings at a time when the grooves and collar are overlapped.

21. The structure of claim 20 further characterized in that said projections are always positioned in said grooves, regardless of the position of said stem.

22. The structure of claim 20 further characterized in that at one position of said stem said projections are outside of said grooves permitting free rotation of said stem.

No references cited.

M. CARY NELSON, *Primary Examiner.*

J. R. DWELLE, *Assistant Examiner.*